UNITED STATES PATENT OFFICE.

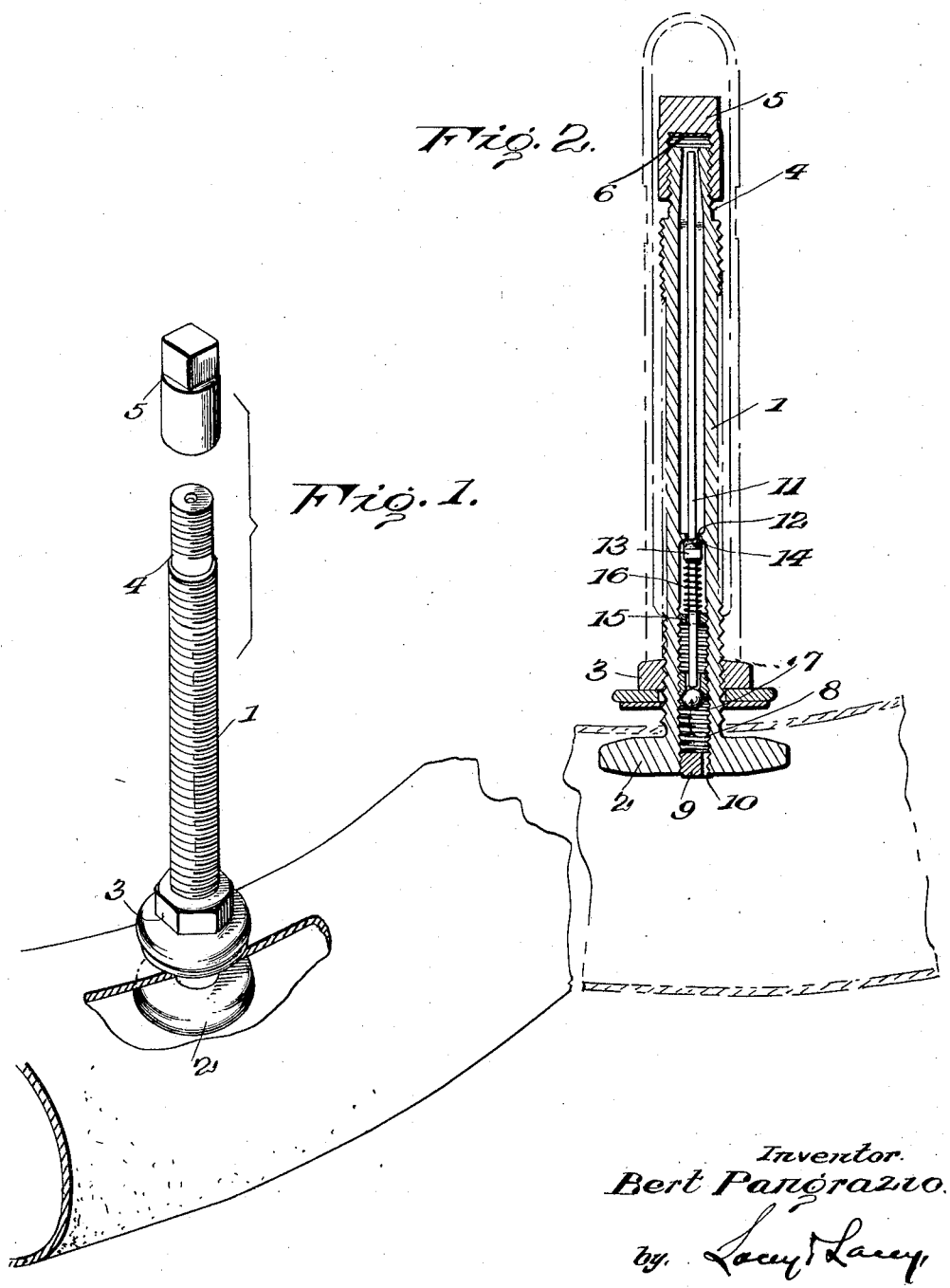

BERT PANGRAZIO, OF SCOTTSVILLE, NEW YORK.

TIRE-VALVE.

1,351,400.  Specification of Letters Patent.  Patented Aug. 31, 1920.

Application filed June 26, 1919. Serial No. 306,893.

*To all whom it may concern:*

Be it known that I, BERT PANGRAZIO, a citizen of the United States, residing at Scottsville, in the county of Monroe and State of New York, have invented certain new and useful Improvements in Tire-Valves, of which the following is a specification.

This invention has for its object the provision of a cheap and simple tire valve whereby the leakage of air from the tire will be effectually prevented.

The invention is illustrated in the accompanying drawing and will be hereinafter first fully described and then particularly pointed out in the appended claim.

In the drawings—

Figure 1 is a perspective view of my improved valve showing the same in position on a tire;

Fig. 2 is a longitudinal section of the valve.

In carrying out my invention, I employ a tubular body 1 which is equipped at its lower end with an annular flange 2 and securing devices 3 whereby it may be fitted within a tire tube and secured thereto in the usual manner. The tube is provided with a central bore throughout its length and its upper end is reduced, as shown at 4, and externally threaded to be engaged by a cap 5 so that the entrance of dust and dirt within the valve body will be prevented, and a packing 6 is provided within the cap so as to seat upon the end of the body and provide an air-tight joint therewith so that air from the tire cannot escape. A collar is threaded within the inner portion of the body and is provided with a valve seat 7 which may be engaged by a ball valve 8 inserted in the bore through the inner or tire end thereof before the body is fitted in the tire. To retain the ball in the bore of the body, a plug 9 is secured in the inner end of the bore and this plug is provided with a longitudinal groove or opening 10 to permit the flow of air into the tire when the same is being inflated. A pin 11 is disposed within the tire and the inner end of said pin normally is disposed adjacent the valve seat 7 so that it may bear upon the ball valve 8 and effect dislodgment of the same should it tend to stick. Above the valve seat 7, an annular flange or shoulder 12 is formed within the valve body and a stop or disk 13 is fitted upon the pin 11 to engage against the under side of this shoulder or flange, a suitable packing 14 being provided on the upper side of said disk to directly engage the said shoulder and form an air-tight joint therewith so that it will aid in preventing leakage. A collar 15, or other form of stop, is provided in the tube 1 below the shoulder 12 and a spring 16 is coiled around the pin 11 between said stop and the disk 13 so that the valve consisting of the disk 13 and packing 14 will be held normally seated. The usual dust cap, shown in dotted lines, may be provided to inclose all the parts.

The tire is inflated in the usual manner, the pressure of the inflowing air overcoming the tension of the spring 16 so that the valve 13 will be unseated and the diameter of the ball 8 being less than the diameter of the bore of the valve body so that the air may readily flow around the ball. The valve seat 7, however, has a minimum diameter less than the diameter of the ball so that after the tire is inflated the pressure of the air therein will hold the ball seated and escape of air will be cut off. It will be readily noted that I have provided an exceedingly simple valve which may be constructed at a low cost and by which the leakage of air will be effectually prevented inasmuch as air checking or holding means are provided at three different points. The ball valve 8 engaging its seat 7 constitutes one of these air-holding points, while the seat 12 and the valve engaging the same constitutes a second air-holding joint and the packing 6 at the end of the valve body provides a third air-holding joint. The lower end of the pin 11 bears upon the ball 8 so that if it be desired to deflate the tire or test the pressure therein, a push exerted upon the outer end of the pin will unseat the valves and permit some air to escape. The valve can be applied to any tire now in use and will be found highly efficient in operation.

Having thus described the invention, what is claimed as new is:

A tire valve comprising a body having a bore screw threaded at one end and provided intermediate its ends with an integral annular valve seat, a valve coöperating with said seat, a pin extending through and guided by said annular valve seat and connected intermediate its ends to said valve, a collar threaded in the inner portion of said body and slidably receiving and guiding said pin, said collar being provided with a valve seat, a ball valve engaging said second named valve seat, a guiding member threaded into said body between said first and second named valve seats, and a coil spring confined between said guiding member and said first named valve seat.

In testimony whereof I affix my signature.

BERT PANGRAZIO. [L. S.]